United States Patent [19]
Marr

[11] 3,726,255
[45] Apr. 10, 1973

[54] CAGE MAT
[75] Inventor: James E. Marr, St. Louis, Mo.
[73] Assignee: Ralston Purina Company, St. Louis, Mo.
[22] Filed: July 8, 1970
[21] Appl. No.: 53,068

[52] U.S. Cl. .................................................119/17
[51] Int. Cl. .............................................A01k 31/00
[58] Field of Search.....................119/17, 18, 21, 22

[56] References Cited

UNITED STATES PATENTS

| | | |
|---|---|---|
| 3,641,983 | 2/1972 | Keen et al. ...........................119/17 |
| 3,326,186 | 6/1967 | Doll.......................................119/19 |
| 2,753,841 | 7/1956 | Hawkins................................119/21 |

FOREIGN PATENTS OR APPLICATIONS 1,081,293   4/1959   France

Primary Examiner—Hugh R. Chamblee
Attorney—Robert W. Brukardt and Lawrence J. Hurst

[57] ABSTRACT

A method of controlling and substantially preventing breast blisters and swollen hocks in the raising of poultry in cages is disclosed. A resilient mat unit is placed in the interior of a standard cage such that the poultry are not in direct contact with a hard surface bottom. In addition, the resilient mat member is provided with openings through which body waste, feathers, waste water and feed materials are allowed to pass. Further, the resilient nature of the mat produces a flexing action so that a self-cleansing action occurs with the normal movement of the poultry.

9 Claims, 3 Drawing Figures

INVENTOR
JAMES E. MARR
BY
*Lawrence J. Hurst*
ATTORNEY

CAGE MAT

BACKGROUND OF THE INVENTION

Attempts to raise poultry and particularly broilers in cage units such that the broilers could be completely raised and taken to the dressing operation without the necessity of an excessive amount of handling is well known in the art. However, these prior attempts to mass produce broilers in cages have been unsuccessful due to the high incidence of breast blisters, swollen hocks, and respiratory disease which occurred in birds being maintained in cages with only wire mesh floors. The respiratory disease condition has been largely controlled by vaccination; however, there previously has not been a satisfactory means of controlling breast blisters and swollen hocks. The existence of breast blisters and swollen hocks in birds is particularly undesirable due to the downgrading of birds at the processing plants resulting in a substantial loss to the producer.

The solutions to the problems encountered with batteries or cage-type arrangements have been unsatisfactory for large scale commercial production. The principal disadvantage to the use of wire mesh floors is the occurrence of breast blisters and swollen hocks and yet it is necessary that some type of mesh floor be provided so as to eliminate the problems which are present due to waste disposal.

As is readily apparent, it is highly desirable to provide a method of permitting the complete raising of broilers in cages so that less space requirements are necessary for the birds, less labor is required per bird, and smaller commercial facilities with larger capacities are possible.

The present method of raising broilers on litter is undesirable due to the space requirements for such operations. In addition, broilers raised on litter have had a high incidence rate of breast blisters and swollen hocks, although not as great as birds raised in wire cages.

In addition, attempts have been made to utilize a nylon mesh material for broiler floors; however, due to the weight problems encountered, it is necessary that sufficient frames or flooring be provided so as to support the mesh and birds therein. These nylon mesh arrangements also have the disadvantages of not satisfactorily controlling breast blisters and swollen hocks. Also, the use of mesh floors requires that the birds be placed in cages for transportation to processing plants and thereby necessitates additional labor expenses per bird.

In view of these foregoing problems, it is applicant's principal object to provide a mat unit which may be utilized in commercially available cages to permit the utilization of large numbers of cages for raising broilers but which eliminates the problems of breast blisters and swollen hocks normally incurred in such cage-type arrangements.

It is another object of the present invention to provide a simplified mat unit which may be readily adapted to presently existing commercial cage units.

It is another object of the present invention to provide mat units which may be easily sterilized and cleaned for repeated use in raising broilers in cage type arrangements.

It is a further object of the present invention to provide a method for completely raising broilers and for transporting them to the processing plants in the same cage unit without the necessity of additional labor.

These and other objects of the present invention will become apparent from the description hereinafter.

SUMMARY OF THE INVENTION

A method of substantially preventing breast blisters and swollen hocks in the raising of poultry in cages comprising placing a resilient mat on the floor of said cage. Another aspect of the invention is making the mat of a resilient material which will withstand natural animal excretions and which will not deleteriously effect the animal.

DESCRIPTION OF THE DRAWINGS

In the drawings which illustrate embodiments of the present invention.

DESCRIPTION OF THE PREFERRED EMBODIMENTS

Although the subject invention could be utilized in the raising of many types of birds or poultry, our principal interest at present is to provide a means of raising broilers in cages without the disadvantageous occurrence of breast blisters and swollen hocks. Therefore, the subject invention is described in terms of being utilized in the raising of broilers but is not intended to be limited thereto and would also be applicable to other birds or fowl susceptible to be raised in cages, i.e., turkeys, chickens, replacement pullets and cockerels, roasters, layers, breeders, etc.

Figure 1:
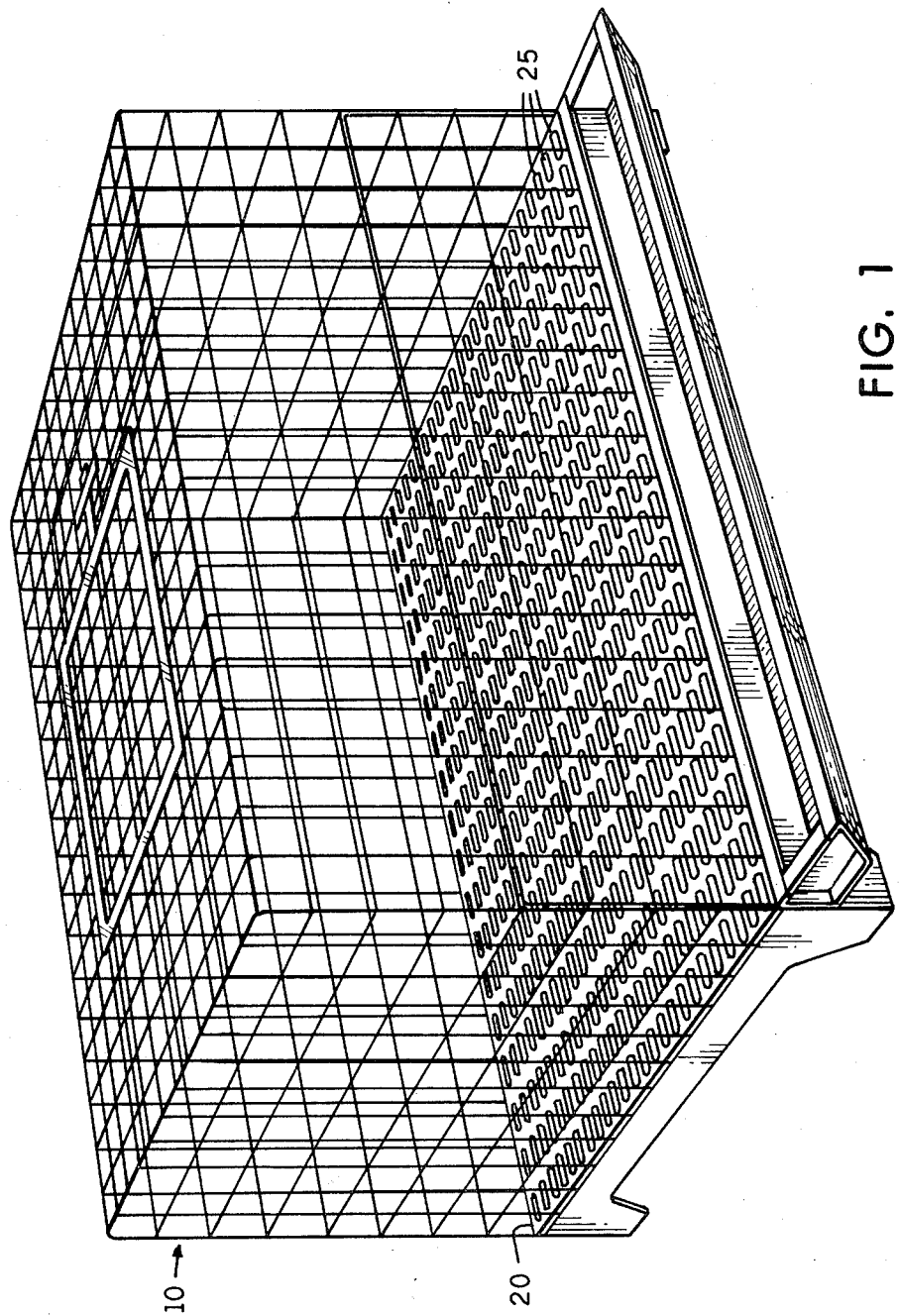
FIg. 1 is a prospective view of a standard commercially available wire cage having the mat unit of the present invention therein.

Referring now to FIG. 1, a standard commercially available wire cage 10 is shown. This cage is of the type that is typical of the type which could be utilized in the raising of broilers.

Figure 3:
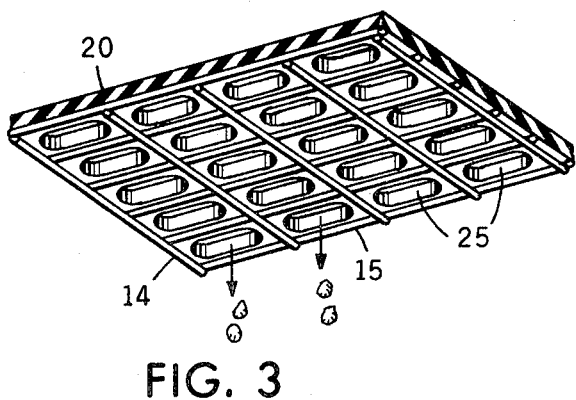
FIG. 3 is a partial section view illustrating the mat unit location on the floor of the cage of FIG. 1.

The floor construction of the cage 10 as shown more clearly in FIG. 3 is formed by wires 12, 14 and in a rectangular configuration. These openings in the floor are necessary in the raising of broilers so that the normal body excretions, feathers, waste water, and feed materials may more readily pass therethrough. The precise configuration of the openings are not critical, but the cage floor should be sufficiently strong to support the weight of the birds therein and have sufficient openings to permit the aforementioned materials to pass therethrough.

Figure 2:
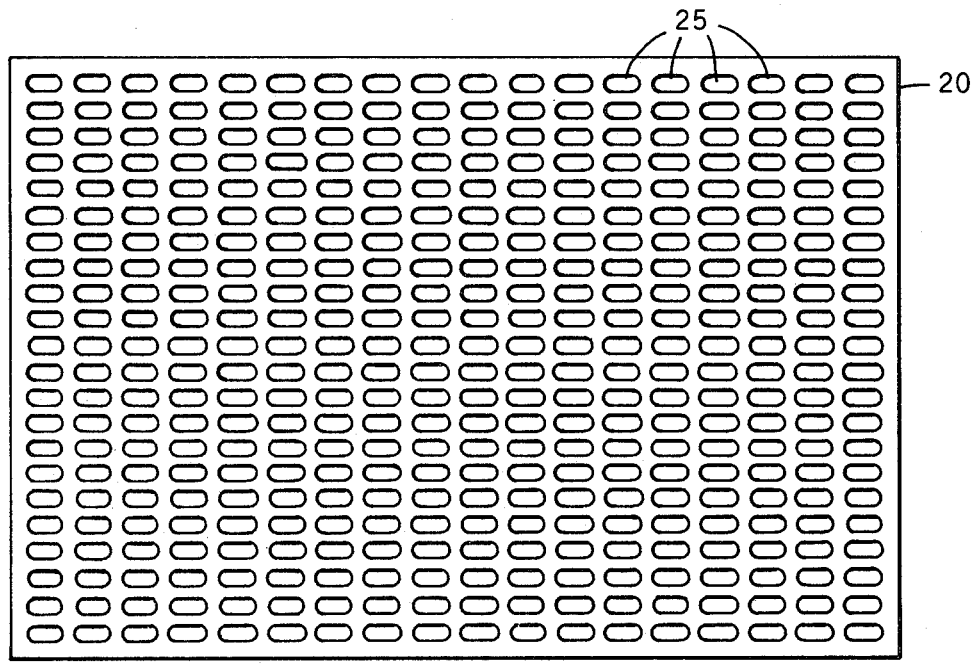
FIG. 2 is a plan view of the mat unit of the present invention.

Referring now to FIGS. 1 and 2, it will be seen that the mat unit 20 is adapted to conform to the shape of the floor of the cage 10. The mat is constructed of any suitable resilient material which will withstand the natural body excretions and not be adversely effected by waste water and feed materials. In addition, it is necessary that the mat be made of a material such that the broilers will not be deleteriously effected by pecking on the mat unit. Further, it is necessary that the mat be capable of withstanding treatment to disinfectants so that it may be cleaned and sterilized for repeated use. Preferably, it has been found that a neoprene composition with a closed cell spongy composition at least of ¼ inch thickness fulfills these requirements. It should be realized that it is not necessary that that mat be constructed of a reusable material; but for economic reasons, it is believed that this would be preferable. However, if the operator so chooses, a disposable mat unit, which produced the same resilient characteristics as hereinbefore described, could satisfactorily be used.

Referring now to FIG. 2, it should be noted that a plurality of oval openings 25 are provided in the mat 20 for registry with the openings in the floor of the cage 10. These oval openings are situated such that body excretions, feathers, waste water and/or feed may readily pass therethrough and not congregate on the cage floor. Since the mat unit is constructed of a resilient material, there is a degree of flexing which is achieved due to the broilers' movement thereon such that the mat has a self-cleansing action and readily discharges droppings and feed therethrough. It is possible that the openings 25 may take on any configuration desired, however, it has been found that by making these openings or configuration in an oval arrangement, a preferred cleaning and flexing action is attained. When utilizing rectangular openings, for instance, there is a slight tendency for droppings to be lodged or caught in the square corners thereof, whereas with the oval arrangement, a more efficient self-cleaning action is achieved.

As is obvious, the particular floor construction of the cage will not be unique and the mat may be adapted to particular opening arrangements to conform to any floor construction desired. The principal object of the mat is to adequately cover the wire or other type of floor construction such that the broiler will not come into direct contact with the floor of the cage and produce breast blisters or swollen hocks. In addition, the flexing action achieved should be sufficient to self-cleanse the mat during the raising of the broilers which should assist in the control of disease of the birds.

Although the present invention has been described as being utilized for adapting commercially existing cage units to the batteries or cage-type arrangement for growing broilers, it should be realized that the same concept could be carried forward into the construction of totally new broiler cages. Thus, it would be possible to incorporate a mat into the broiler cage flooring by either molding a resilient material around the wire, bonding the resilient material to the flooring material or of making the floor of a resilient material which is sufficiently strong to uphold the weight of broilers held therein.

By utilizing cages embodying the present invention, it is possible that large batteries or cage type arrangements could be utilized enabling complete broiler production to be effected in a single cage. Thus, the broilers would be in a cage unit until grown and ready for processing and then transported to the processing plant all in the same single cage unit.

In processing birds tested on these mat units, it has been observed that the bone fragility of the birds raised in such cages is substantially the same as that for birds raised on litter. Thus, the birds not only are of greater value due to the nonexistence of breast blisters and swollen hocks (breast blisters and swollen hocks requiring their downgrading resulting in a loss of value), but also due to the bone fragility results, the birds may be processed without incurring additional wing breakage. Several tests have been run to compare the mat unit concept versus the present utilization of wire cages and litter raising techniques. The results of these tests indicate that with the utilization of a ¼ inch thick neoprene closed cell spongy composition mat, the birds are approximately 90 percent free of breast blisters. The closed cell neoprene rubber utilized was 42 grade (medium) although other materials having approximately the same resiliency may be utilized to obtain the desired result. In addition, when using a ⅜ inch thick neoprene closed cell spongy composition mat as previously described, the birds were 100 percent free of breast blisters. These results are highly significant when compared with field data which shows that birds raised on litter average approximately 10 – 15 percent breast blisters. In addition, birds raised in wire cages have had approximately 80 – 100 percent breast blisters.

In view of the foregoing, it is readily apparent that a novel cage mat and process for using same has been described and that those skilled in the art may make certain changes or modifications in the cage mat and its use without departing from the spirit of the invention.

I claim:

1. A method of controlling and substantially preventing breast blisters in the raising of poultry in cages having openings in the floor thereof comprising: placing a resilient mat on the floor of said cage, said mat including openings adapted for alignment with the openings in the cage floor whereby the poultry is protected from directly contacting the cage floor, and said mat being sufficiently flexible to permit the self-cleansing thereof due to the movement of the poultry on said resilient mat.

2. The method according to claim 1 wherein said openings are oval.

3. The method according to claim 1 wherein said mat is at least ¼ inch thick.

4. The method according to claim 3 wherein the mat is ⅜ inch thick.

5. The method according to claim 1 wherein said mat is constructed of closed cell spongy neoprene.

6. The method of controlling and substantially preventing breast blisters in the raising of poultry in cages having openings in the floor thereof comprising: covering the floor of the said cage with a resilient material which is resistant to poultry excretions, and which will not deleteriously effect the poultry, said covered floor having openings therein permitting the ready disposal of the poultry excretions therethrough and having sufficient flexiblity to permit the self-cleaning thereof due to the movement of the poultry on said covered floor.

7. A mat unit for use in the raising of broilers in cages having openings in the floor thereof to control and substantially prevent the occurrence of breast blisters comprising: a resilient material of at least ¼ inch thickness having a size substantially identical to the size of the cage floor, and a plurality of openings in said resilient material suitable for registry with the openings in said cage floor, said resilient material being resistant to natural poultry excretions and disinfectants.

8. The mat unit according to claim 7 wherein the openings are oval.

9. The mat unit according to claim 7 wherein the resilient material is closed celled spongy neoprene and the mat is between ¼ inch and ⅜ inch thick.

* * * * *